US008923272B2

(12) United States Patent
Zhang

(10) Patent No.: US 8,923,272 B2
(45) Date of Patent: Dec. 30, 2014

(54) METHOD AND APPARATUS FOR MULTIPLEXING A HOST IDENTITY PROTOCOL SECURITY CHANNEL

(71) Applicant: Huawei Technologies Co., Ltd., Shenzhen, Guangdong (CN)

(72) Inventor: Dacheng Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 13/651,085

(22) Filed: Oct. 12, 2012

(65) Prior Publication Data

US 2013/0034112 A1   Feb. 7, 2013

Related U.S. Application Data

(63) Continuation of application No. PCT/CN2011/070975, filed on Feb. 14, 2011.

(30) Foreign Application Priority Data

Apr. 14, 2010   (CN) .......................... 2010 1 0149991

(51) Int. Cl.
*H04B 7/212* (2006.01)
*H04L 29/06* (2006.01)
*H04J 7/00* (2006.01)
*H04L 29/12* (2006.01)

(52) U.S. Cl.
CPC ..... *H04L 63/0281* (2013.01); *H04J 2203/0069* (2013.01); *H04J 7/00* (2013.01); *H04L 61/103* (2013.01); *H04L 61/2084* (2013.01); *H04L 63/0471* (2013.01)
USPC ............ 370/348; 370/322; 370/302; 370/278

(58) Field of Classification Search
CPC ........................... H04J 7/00; H04J 2203/0069

USPC .................. 370/392, 475, 348, 322, 302, 278
See application file for complete search history.

(56) References Cited

U.S. PATENT DOCUMENTS 6,795,917 B1 *   9/2004   Ylonen .......................... 713/160
6,915,437 B2 *   7/2005   Swander et al. .................. 726/1
(Continued)

FOREIGN PATENT DOCUMENTS

CN           1728628 A        2/2006
CN           1938999 A        3/2007
(Continued)

OTHER PUBLICATIONS

Written Opinion of the International Search Authority dated May 26, 2011 in connection with International Patent Application No. PCT/CN2011/070975.
(Continued)

*Primary Examiner* — Ricky Ngo
*Assistant Examiner* — Dewanda Samuel

(57) ABSTRACT

Embodiments of the present invention relate to the field of security channel multiplexing, and disclose a method and an apparatus for multiplexing a HIP security channel. A method includes: receiving a message for requesting to transmit data; detecting whether a HIP security channel is established with the HIP host; if true, transmitting control signaling to the HIP host, where the control signaling is used to request to multiplex the HIP security channel to transmit data of the traditional host; if a response message returned from the HIP host is received, transmitting the data of the traditional host to the HIP host through the HIP security channel. With embodiments of the present invention, the quantity of HIP security channels established between the HIP proxy and the HIP host and the loads of maintaining the security channel can be reduced, and the utilization of the HIP security channel is increased.

14 Claims, 5 Drawing Sheets

(56) References Cited

U.S. PATENT DOCUMENTS

| | | | |
|---|---|---|---|
| 7,620,810 B2 * | 11/2009 | Vaarala et al. | 713/161 |
| 7,827,313 B2 * | 11/2010 | Salmela et al. | 709/246 |
| 7,996,675 B2 * | 8/2011 | Nikander | 713/168 |
| 8,041,939 B2 * | 10/2011 | Ylitalo et al. | 713/151 |
| 2006/0020787 A1 | 1/2006 | Choyi et al. | |
| 2007/0038853 A1 | 2/2007 | Day et al. | |
| 2007/0204150 A1 * | 8/2007 | Jokela et al. | 713/161 |
| 2007/0274312 A1 | 11/2007 | Salmela et al. | |
| 2010/0284400 A1 * | 11/2010 | Melen et al. | 370/389 |

FOREIGN PATENT DOCUMENTS

| | | |
|---|---|---|
| CN | 101027888 A | 8/2007 |
| CN | 101292233 A | 10/2008 |
| EP | 2 434 718 A1 | 3/2012 |
| WO | WO 2005/081466 A1 | 9/2005 |

OTHER PUBLICATIONS

Patrik Salmela, et al., "Host Identity Protocol Proxy", ICETE 2005, CCIS 3, 2007, p. 126-138.

International Search Report dated May 26, 2011 in connection with International Patent Application No. PCT/CN2011/070975.

Supplementary European Search Report dated Mar. 1, 2013 in connection with European Patent Application No. EP 11 76 8373.

Dacheng Zhang, et al., "Investigation in HIP Proxies", Network working group, Oct. 19, 2009, 14 pages.

Partial translation of Office Action dated Jun. 4, 2013 in connection with Chinese Patent Application No. 201010149991.1.

* cited by examiner

METHOD AND APPARATUS FOR MULTIPLEXING A HOST IDENTITY PROTOCOL SECURITY CHANNEL

CROSS-REFERENCE TO RELATED APPLICATIONS

This application is a continuation of International Application No. PCT/CN2011/070975, filed on Feb. 14, 2011, which claims priority to Chinese Patent Application No. 201010149991.1, filed on Apr. 14, 2010, both of which are hereby incorporated by reference in their entireties.

TECHNICAL FIELD

The present invention relates to the field of multiplexing security channel, and in particular, to a method and an apparatus for multiplexing a host identity protocol security channel.

BACKGROUND

On the Internet, an Internet Protocol (IP) address is not only used as an identifier of location of a host at the network layer but also used as an identifier of the host at the transport layer. Therefore, the principle of minimizing the coupling between different layers in the layered structure of the Internet is actually violated, and the close coupling between the network layer and the transport layer hinders independent development of the layers. For example, when the host moves on the Internet, the IP address used as the identifier of the host should not be changed, while the IP address used as the identifier of location of the host on the Internet should be changed. Hence, the logical concept is confusable.

To separate the identifier of the host from the identifier of location of the host, the Internet Engineering Task Force (IETF) launches an comprehensive solution, where the solution introduces a new namespace—host identity (Host Identity, HI) and a new sub-layer—host identity protocol (Host Identity Protocol, HIP) layer between the network layer and the transport layer. Above the HIP layer, the HI is used to identify the host, which was the task of the IP address, and the IP address is dedicated to identify the location of the host on the network. In this way, when the host moves on the network, the HI used as the identifier of the host is not changed, and only the IP address used as an identifier of location on the network is changed. In essence, the HI is a public key in a public/private key pair. The length of the HI varies depending on algorithms in different public key systems. However, a host identity tag (HIT) with a fixed length (128 bits) is generally used in the actual protocol to identify the host. The HIT is a 128-bit binary number and is generated from the HI by using a hash algorithm.

A host, the identifier of which is the HI is called a HIP host. Without the HI, the traditional host cannot be interconnected with the HIP host, therefore a HIP proxy plays an important role in the HIP solution. The HIP proxy allocates an HI and a private key corresponding to the HI to each traditional host managed by the HIP Proxy, and communicates with the HIP host in place of the traditional host. To ensure the security of communication, the HIP proxy must establish a security channel for each pair of traditional host and HIP host that communicate with each other. If one HIP host communicates with multiple traditional hosts, the HIP proxy must shake hands with the same HIP host multiple times, and establish multiple HIP security channels respectively. Therefore, the quantity of HIP security channels is large, and maintenance loads are increased.

SUMMARY

The technical issue to be solved by embodiments of the present disclosure is to provide a method and an apparatus for multiplexing a host identity protocol security channel, which can reduce the quantity of HIP security channels and reduce maintenance loads.

To solve the above technical issue, embodiments of the present disclosure provide the following technical solutions:

An aspect of the present disclosure provides a method for multiplexing a host identity protocol, HIP, security channel, including:

receiving a message for requesting to transmit data, where the message is sent from at least one traditional host to a HIP host;

detecting whether a HIP security channel is established with the HIP host; if the HIP security channel is established, transmitting control signaling to the HIP host, where the control signaling is used to request to multiplex the HIP security channel to transmit the data of the traditional host; and if a response message returned from the HIP host is received, transmitting the data of the traditional host to the HIP host through the HIP security channel.

Another aspect of the present disclosure provides a method for multiplexing a host identity protocol, HIP, security channel, including:

detecting, by a HIP host, whether a HIP security channel is established with a HIP proxy; if the HIP security channel is established, transmitting control signaling to the HIP proxy, where the control signaling is used to request to multiplex the HIP security channel to transmit data of the HIP host to a traditional host through the HIP proxy; and if a response message returned from the HIP proxy is received, transmitting the data of the HIP host to the HIP proxy through the HIP security channel.

Another aspect of the present disclosure provides an apparatus for multiplexing a host identity protocol, HIP, security channel, including:

a first receiving unit, configured to receive a message for requesting to transmit data, where the message is sent from at least one traditional host to a HIP host;

a detection unit, configured to detect whether a HIP security channel is established with the HIP host;

a first signaling unit, configured to transmit control signaling to the HIP host when detection result of the detection unit is true, where the control signaling is used to request to multiplex the HIP security channel to transmit the data of the traditional host; and a first control unit, configured to transmit the data of the traditional host to the HIP host through the HIP security channel when a response message returned from the HIP host is received.

Another aspect of the present disclosure provides a host identity protocol, HIP, host, including:

a third detection unit, configured to detect whether a HIP security channel is established with a HIP proxy;

a third signaling unit, configured to transmit control signaling to the HIP proxy when the detection result of the third detection unit is true, where the control signaling is used to request to multiplex the HIP security channel to transmit data of the HIP host; and a third control unit, configured to transmit the data of the HIP host to the HIP proxy through the HIP security channel when a response message returned from the HIP proxy is received.

In aspects of the present disclosure, when it is detected that a HIP security channel is established between a HIP proxy and a HIP host, control signaling may be transmitted in the established HIP security channel, where the control signaling is used to request to multiplex the established HIP security channel to transmit data. In this way, the quantity of HIP security channels established between the HIP proxy and the HIP host and the loads for maintaining the security channel are reduced, and the utilization of the HIP security channel is increased.

BRIEF DESCRIPTION OF THE DRAWINGS

To make the technical solutions in embodiments of the present invention clearer, the accompanying drawings for illustrating the embodiments of the present invention are briefly described below. Evidently, the accompanying drawings illustrate only some embodiments of the present invention, and persons of ordinary skill in the art may derive other drawings from these drawings without making any creative effort.

DETAILED DESCRIPTION

The technical solutions provided in embodiments of the present invention are hereinafter described clearly and completely with reference to the accompanying drawings. It is evident that the embodiments are only exemplary ones, rather than all embodiments. Persons of ordinary skill in the art may derive other embodiments from the embodiments given herein without making any creative effort, and all such embodiments are covered in the protection scope of the present invention.

In this application, a channel refers to a mechanism in which messages are transmitted in a specific packet format, and does not specially refer to an IP security (IPSec) tunnel mode. The IPSec tunnel mode, IPSec transport mode, bound end-to-end tunnel (BEET), and so on may all be called a channel.

Embodiment 1

Figure 1:
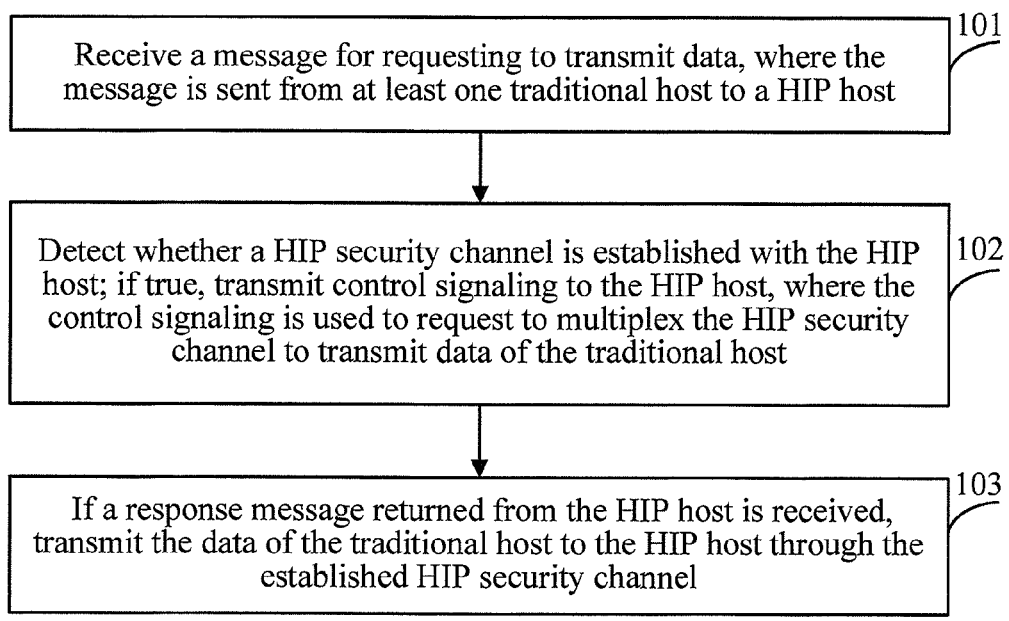
FIG. 1 is a flow chart of a method for multiplexing a HIP security channel according to an embodiment of the present invention.

FIG. 1 is a schematic flow chart of a method for multiplexing a HIP security channel according to Embodiment 1 of the present invention. As shown in FIG. 1, the method may include the following:

101. A HIP proxy receives a message for requesting to transmit data, where the message is sent from at least one traditional host to a HIP host.

In the embodiment of the present invention, the HIP proxy may receive a message for requesting to transmit data, where the message is sent from at least one traditional host to the HIP host; and the HIP proxy processes and encapsulates the message sent from the traditional host, and sends the message to the HIP host.

The HIP proxy may obtain related information from the message for requesting to transmit data sent from the traditional host, and further obtain corresponding information used to access the HIP host. For example, the HIP proxy obtains, through a domain name system (DNS), corresponding information used to access the HIP host; or the HIP proxy obtains, according to the message for requesting to transmit data sent from the traditional host, corresponding information used to access the HIP host from HIP host information stored locally in advance, which is not limited in the embodiment of the present invention.

102. The HIP proxy detects whether a HIP security channel is established between the HIP proxy and the HIP host; if the HIP security channel is established between the HIP proxy and the HIP host, the HIP proxy sends control signaling to the HIP host, where the control signaling is used to request the HIP host to multiplex the established HIP security channel to transmit the data of the traditional host; and otherwise, the HIP proxy establishes a HIP security channel between the HIP proxy and the HIP host.

When transmitting the control signaling to the above HIP host, the HIP proxy may transmit the control signaling through an established HIP security channel or encrypt or sign the control signaling using an HI of the HIP proxy and a private key corresponding to the HI.

In the embodiment of the present invention, the HIP proxy may determine whether a HIP security channel is established between the HIP proxy and the HIP host by detecting whether valid HIP association information with the HIP host is stored in the HIP proxy. The above valid HIP association information refers to HIP association information between the HIP proxy and the HIP host, which is not invalid and is stored when the HIP proxy establishes a HIP security channel with the HIP host. Specifically, the HIP proxy and the HIP host need to perform the HIP base Exchange protocol to establish a HIP security channel. After performing the HIP base Exchange protocol, the HIP proxy obtains HIP association information with the HIP host, where the HIP association information includes key information and so on.

If the HIP proxy stores valid HIP association information between the HIP proxy and the HIP host, it can be determined that a HIP security channel is established between the HIP proxy and the HIP host; and otherwise, if the HIP proxy does not store valid HIP association information between the HIP proxy and the HIP host, it is determined that a HIP security channel is not established between the HIP proxy and the HIP host.

When determining that a HIP security channel is not established between the HIP proxy and the HIP host, the HIP proxy may establish a HIP security channel with the HIP host according to an HI_1 allocated to the traditional host and a private key corresponding to the HI_1, where two ends of the security channel are the HIP proxy and the HIP host; or the HIP proxy may establish a HIP security channel with the HIP host according to an HI_2 of the HIP proxy and a private key corresponding to the HI_2.

When the HIP proxy determines that a HIP security channel is established between the HIP proxy and the HIP host, the control signaling that the HIP proxy transmits to the HIP host may carry identifier of the traditional host, where the identifier may be at least one of the following contents: a HIT and an HI that the HIP proxy allocates to the traditional host, and a security parameter index (SPI) identifying the above traditional host in the established HIP security channel.

Take the SPI as an example, the SPI of the traditional host is generated by the HIP proxy for the traditional host, while the SPI of the HIP host is generated by the HIP host itself. In this way, the HIP host may identify, according to the SPI that the HIP proxy allocates to the traditional host, with which traditional host the data is to be transmitted. In addition, after receiving a packet sent from the HIP host, the HIP proxy may identify, according to the SPI that the HIP proxy allocates to the traditional host, with which traditional host the HIP host expects to communicate.

103. If a response message returned from the HIP host is received, where the response message indicates that the HIP host agrees to multiplex the established HIP security channel, the HIP proxy transmits the data of the traditional host to the HIP host through the established HIP security channel.

Optionally, in the embodiment of the present invention, if failing to receive the response message returned from the HIP host, the HIP proxy may retransmit control signaling to the HIP host to request to multiplex the HIP security channel to transmit the data of the traditional host, until the number of times that the control signaling is transmitted reaches a specified number.

The HIP proxy may encapsulate the data sent to the HIP host through the HIP security channel, and carry identifier of the traditional host. The identifier of the traditional host may include at least one of the following contents: the SPI, HIT, and HI that the HIP proxy allocates to the traditional host.

For example, the data of the traditional host sent to the HIP host through the HIP security channel may be encapsulated according to a standard IPSec tunnel mode, for example, the format of an IPSec tunnel packet is shown in Table 1. In this way, the HIP host may identify, according to the identifier of the traditional host, from which traditional host the data received by the HIP host comes.

TABLE 1

Packet format in the IPSec tunnel mode

| First IP Packet Header | ESP Packet Header | Second IP Packet Header | Payload | ... |
|---|---|---|---|---|
| First IP Packet Header | AH Packet Header | Second IP Packet Header | Payload | ... |

For example, the IP address field in the second IP packet header following the encapsulating security payload (ESP) packet header may be replaced with the HIT of the HIP host;

or an SPI in the authentication header (AH) may be set to the SPI of the HIP host;

or, an SPI in the ESP packet header may be set to the SPI of the HIP host;

or, the identifier of the HIP host may be inserted between the ESP packet header and the second IP packet header;

or, the identifier of the HIP host may be inserted between the AH packet header and the second IP packet header.

TABLE 2

Packet format in the IPSec transport mode

| IP Packet Header | ESP Packet Header | Transport Layer Protocol Packet Header | Payload | ... |
|---|---|---|---|---|

TABLE 2-continued

Packet format in the IPSec transport mode

| IP Packet Header | AH Packet Header | Transport Layer Protocol Packet Header | Payload | ... |
|---|---|---|---|---|

In another example, the data of the traditional host sent to the HIP host through the HIP security channel may be encapsulated according to a standard IPSec transport mode, as shown in Table 2. For example, an SPI of the ESP packet header may be set to the SPI of the HIP host; or an SPI of the AH packet header may be set to the SPI of the HIP host; or the identifier of the HIP host is inserted between the ESP packet header and a following transport layer protocol packet header; or the identifier of the HIP host is inserted between the AH packet header and a following transport layer protocol packet header.

The identifier of the HIP host may include at least one of the following contents: the HIT and HI of the HIP host, and the SPI of the host. The transport layer protocol packet may be a TCP (Transmission Control Protocol) packet, or a UDP (User Datagram Protocol) packet, or other transport layer protocol packet.

In another example, the data of the traditional host sent to the HIP host through the HIP security channel may be encapsulated according to a standard bound end-to-end tunnel (BEET) mode. As shown in Table 3, when the data is encapsulated according to the BEET mode, the identifier of the HIP host is inserted between the ESP packet header of the packet in the BEET mode and the following transport layer protocol packet header.

TABLE 3

| IP Packet Header | ESP Packet Header | Transport Layer Protocol Packet Header | Payload |
|---|---|---|---|
| IP Packet Header | AH Packet Header | Transport Layer Protocol Packet Header | Payload |

Or, the identifier of the HIP host is inserted between the AH packet header and a following transport layer protocol packet header; or the SPI of the ESP packet header of the packet is set to the SPI of the HIP host;

or, the SPI of the AH packet header of the packet is set to the SPI of the HIP host.

The identifier of the HIP host may include at least one of the following contents: the HIT and the HI of the HIP host, and the SPI of the HIP host.

The transport layer protocol packet may be a TCP packet, a UDP packet, or other transport layer protocol packet.

When the data of the traditional host is transmitted to the HIP host through the HIP proxy, the HIP host may transmit data to the traditional host through the HIP proxy. When transmitting data to the traditional host through the HIP proxy, the HIP host encapsulates the data that to be send to the HIP proxy. After receiving the data sent from the HIP host, the HIP proxy decapsulates the data, and forwards the data to the traditional host.

When the data of the HIP host sent through the HIP security channel to the traditional host through the HIP proxy is encapsulated according to the IPSec tunnel mode, the HIP host may replace the IP address field in the second IP packet header following the ESP packet header with a HIT that the HIP proxy allocates to the traditional host;

Or, the SPI in the AH packet header is set to the SPI that the HIP proxy generates for the traditional host; or the SPI in the ESP packet header is set to the SPI that the HIP proxy generates for the traditional host;

or, the identifier of the traditional host may be inserted between the ESP packet header and the second IP packet header;

or, the identifier of the traditional host may be inserted between the AH packet header and the second IP packet header.

In addition, the data of the HIP host sent through the HIP security channel to the traditional host through the HIP proxy may be encapsulated according to a standard IPSec transport mode. For example, the SPI in the ESP packet header may be set to the SPI that the HIP proxy generates for the traditional host; or the SPI in the AH packet header may be set to the SPI that the HIP proxy generates for the traditional host; or the identifier of the traditional host is inserted between the ESP packet header and the transport layer protocol packet header; or the identifier of the traditional host is inserted between the AH packet header and the transport layer protocol packet header.

The identifier of the traditional host may include at least one of the following contents: the HIT and HI that the HIP proxy allocates to the traditional host, and the SPI that the HIP proxy generates for the traditional host. The above transport layer protocol packet may be a TCP packet, a UDP packet, or other transport layer protocol packet.

In this way, the HIP proxy may identify to which traditional host the received data is transmitted.

In Embodiment 1 of the present invention, when detecting that a HIP security channel is established between the HIP proxy and the HIP host, the HIP proxy may transmit control signaling to the HIP host to request to multiplex the established HIP security channel to transmit the data of the traditional host. In this way, the quantity of HIP security channels established between the HIP proxy and the HIP host and the loads for maintaining the security channel are reduced, and the utilization of the HIP security channel is increased.

Embodiment 2

Figure 2:
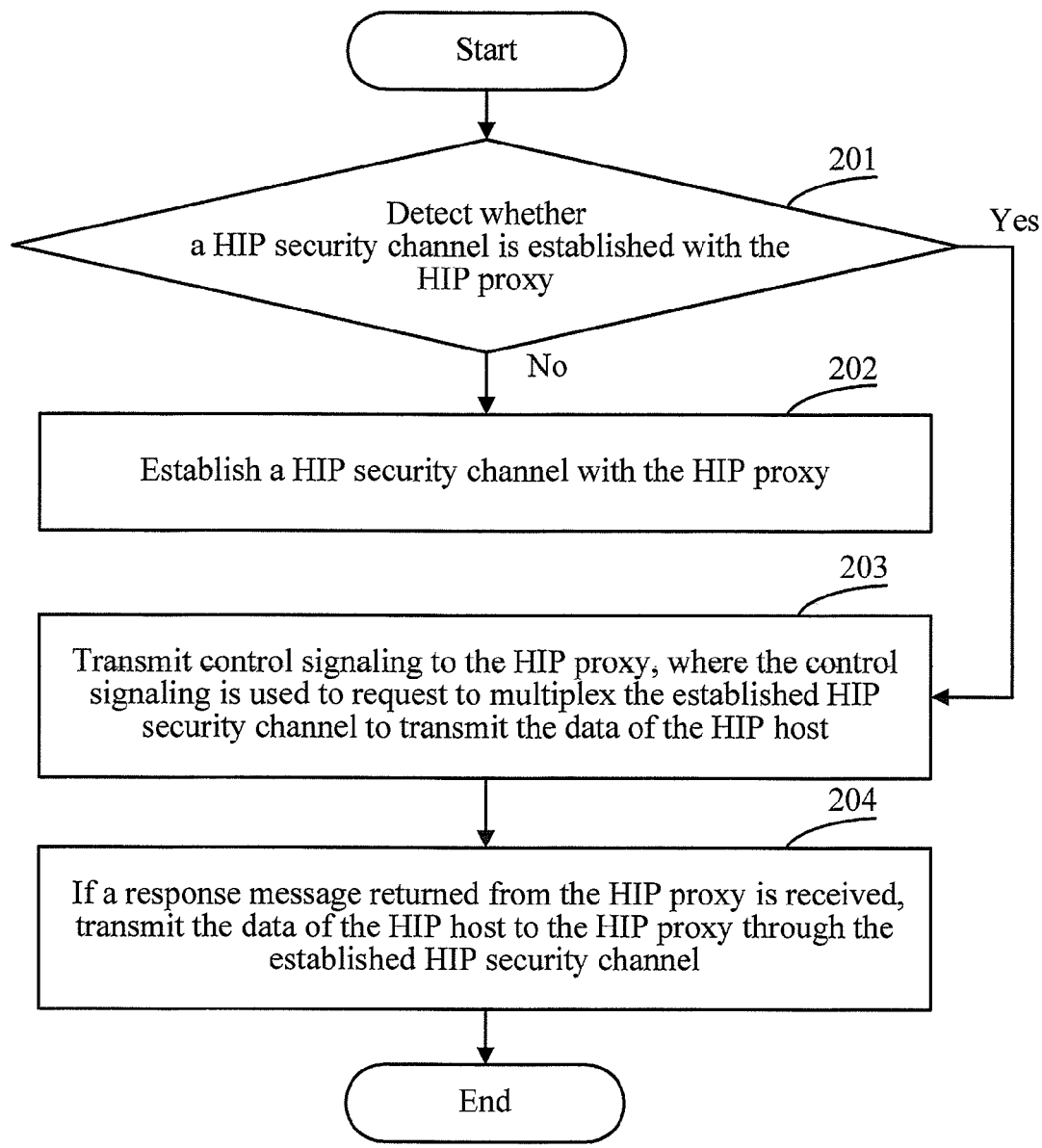
FIG. 2 is a flow chart of a method for multiplexing a HIP security channel according to another embodiment of the present invention.

FIG. 2 is a schematic flow chart of a method for multiplexing a HIP security channel according to Embodiment 2 of the present invention. As shown in FIG. 2, the method may include the following:

201. A HIP host detects whether a HIP security channel is established with a HIP proxy; if yes, the process goes to 203; and otherwise, the process goes to 202.

In the embodiment of the present invention, the HIP host may determine whether a HIP security channel is established between the HIP host and the HIP proxy by detecting whether valid HIP association information with the HIP proxy is stored in the HIP host. If the HIP host stores valid HIP association between the HIP host and the HIP proxy, it can be determined that a HIP security channel is established between the HIP host and the HIP proxy; and otherwise, if the HIP host does not store valid HIP association between the HIP host and the HIP proxy, it can be determined that a HIP security channel is not established between the HIP host and the HIP proxy. The valid HIP association information is stored when the HIP host and the HIP proxy establish a HIP security channel.

Specifically, the HIP host and the HIP proxy need to perform the HIP base exchange protocol to establish a HIP security channel. After performing the HIP base Exchange protocol, the HIP host obtains a piece of HIP association information with the HIP proxy, where the HIP association information includes key information and so on.

202. Establish a HIP security channel between the HIP host and the HIP proxy.

If determining that the HIP security channel is not established between the HIP host and the HIP proxy or the traditional host, the HIP host may obtain an HI_3 of the HIP proxy and a private key corresponding to the HI_3 from a domain name system (DNS), and then establish a HIP security channel using the HI_3 and the private key corresponding to the HI_3.

203. Transmit control signaling to the HIP proxy, where the control signaling is used to request to multiplex the established HIP security channel to transmit the data of the HIP host.

The control signaling that the HIP host transmits to the HIP proxy may carry identifier of the HIP host, where the identifier of the HIP host may include at least one of the following contents: the HIP and HI of the HIP host, and the SPI of the HIP host. In this way, the HIP proxy may identify which HIP host needs to multiplex the established HIP security channel to transmit data with the HIP proxy. When transmitting control signaling to the above HIP proxy, the HIP host may transmit the control signaling through an established HIP security channel or encrypt or sign the control signaling using an HI of the HIP host and a private key corresponding to the HI.

204. If a response message returned from the HIP proxy is received, where the response message indicates that the HIP proxy agrees to multiplex the established HIP security channel, the HIP host transmits, through the established HIP security channel, the data of the HIP host to at least one traditional host through the HIP proxy.

In the embodiment of the present invention, if failing to receive the response message returned from the HIP proxy, the HIP host may retransmit control signaling to the HIP proxy to request to multiplex the HIP security channel to transmit the data of the HIP host, until the number of times that the control signaling is transmitted reaches a specified number.

The data that the HIP host transmits to the HIP proxy through the HIP security channel may be encapsulated according to a standard IPSec tunnel mode. For example, the IP address field in the second IP packet header following the ESP packet header in the IPSec tunnel mode may be replaced with a HIT that the HIP proxy allocates to the traditional host;

or, the SPI in the AH packet header is set to the SPI that the HIP proxy generates for the traditional host; or the SPI in the ESP packet header is set to the SPI that the HIP proxy generates for the traditional host; or the identifier of the traditional host is inserted between the ESP packet header and the second IP packet header.

Or, the identifier of the traditional host may be inserted between the AH packet header and the second IP packet header.

In addition, the data that the HIP host transmits to the HIP proxy through the HIP security channel may be encapsulated according to a standard IPSec transport mode. For example, the SPI of the ESP packet header in the IPSec transport mode may be set to the SPI that the HIP proxy generates for the traditional host; or the SPI in the AH packet header may be set to the SPI that the HIP proxy generates for the traditional host; or the identifier of the traditional host is inserted between the ESP packet header and a transport layer protocol packet header; or the identifier of the traditional host is inserted between the AH packet header and a transport layer protocol packet header.

The identifier of the traditional host may include at least one of the following contents: the HIT and HI that the HIP proxy allocates to the traditional host, and the SPI that the HIP proxy generates for the traditional host. The transport layer protocol packet may be a TCP packet, a UDP packet, or other transport layer protocol packet.

In this way, the HIP proxy may identify to which traditional host the received data is transmitted.

Or, the data that the HIP host transmits to the HIP proxy through the HIP security channel may also be encapsulated according to a standard BEET mode. For example, the identifier of the traditional host may be inserted between the ESP packet header and a transport layer protocol packet header, or the identifier of the traditional host may be inserted between the AH packet header of the packet in the BEET mode and a following transport layer protocol packet header; or the SPI in the ESP packet header of the packet may be set to the SPI that the HIP proxy allocates to the traditional host; or the SPI in the AH packet header may be set to the SPI that the HIP proxy allocates to the traditional host.

The identifier of the traditional host may include at least one of the following contents: the HIT and HI that the HIP proxy allocates to the traditional host, and the SPI that the HIP proxy generates for the traditional host. The transport layer protocol packet may be a TCP packet, a UDP packet, or other transport layer protocol packet.

After receiving the data sent from the HIP host through the established HIP security channel, the HIP proxy decapsulates the data sent from the HIP host and forwards the data to the corresponding traditional host.

When the data of the HIP host is transmitted to the traditional host through the HIP proxy, the traditional host may transmit data to the HIP host through the HIP proxy. When the traditional host transmits data to the HIP host through the HIP proxy, the HIP proxy encapsulates the received data of the traditional host and forwards the data to the HIP host.

The HIP proxy may encapsulate the data sent to the HIP host through the HIP security channel, and carry the identifier of the traditional host in the data. The identifier of the traditional host may include at least one of the following contents: the SPI that the HIP proxy allocates to the traditional host, and the HIT and HI that the HIP proxy allocates to the traditional host.

The data that the traditional host transmits to the HIP host through the HIP security channel may be encapsulated according to a standard IPSec tunnel mode. In this way, the HIP host may identify, according to the identifier of the traditional host, from which traditional host the data received by the HIP host comes.

For example, the IP address field in the second IP packet header following an encapsulating security payload (ESP) packet header in the IPSec tunnel mode may be replaced with the HIT of the HIP host;

or, the SPI in the AH packet header may be set to the SPI of the HIP host;

or, the SPI in the ESP packet header may be set to the SPI of the HIP host; or the identifier of the HIP host is inserted between the ESP packet header and the second IP packet header; or the identifier of the HIP host is inserted between the AH packet header and the second IP packet header.

In addition, the data that the traditional host transmits to the HIP host through the HIP security channel may be encapsulated according to a standard IPSec transport mode. For example, the SPI in the ESP packet header may be set to the SPI of the HIP host; or the SPI in the AH packet header may be set to the SPI of the HIP host; or the identifier of the HIP host is inserted between the ESP packet header and a transport layer protocol packet header; or the identifier of the HIP host is inserted between the AH packet header and a transport layer protocol packet header.

The identifier of the HIP host may include at least one of the following contents: the HIT and HI of the HIP host, and the SPI of the host. The transport layer protocol packet may be a TCP packet, a UDP packet, or other transport layer protocol packet.

The data that the traditional host transmits to the HIP host through the HIP security channel may be encapsulated according to a standard bound end-to-end tunnel (BEET) mode. Or, the identifier of the HIP host is inserted between the ESP packet header and a transport layer protocol packet header;

or, the identifier of the HIP host is inserted between the AH packet header and a transport layer protocol packet header; or the SPI in the ESP packet header of the packet is set to the SPI of the HIP host;

or, the SPI in the AH packet header is set to the SPI of the HIP host.

The identifier of the HIP host may include at least one of the following contents: the HIT and the HI of the HIP host, and the SPI of the HIP host.

The transport layer protocol packet may be a TCP packet, a UDP packet, or other transport layer protocol packet.

In Embodiment 2 of the present invention, when the HIP host needs to transmit data with the traditional host, if the HIP host detects that a HIP security channel is established between the HIP host and the HIP proxy, the HIP host may transmit control signaling to the HIP proxy to request to multiplex the established HIP security channel to transmit the data of the HIP host. In this way, the quantity of HIP security channels established between the HIP proxy and the HIP host and the loads of maintaining the security channel are reduced, and the utilization of the HIP security channel is increased.

Embodiment 3

Figure 3:
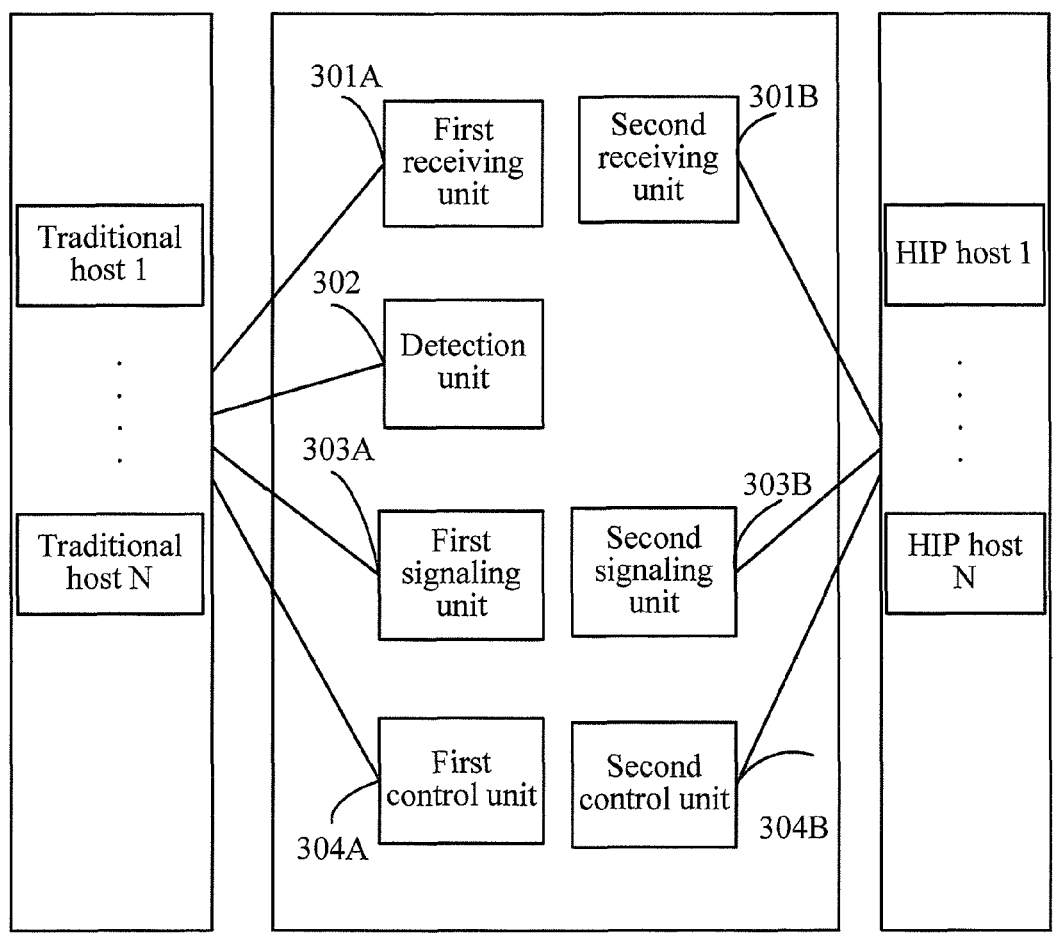
FIG. 3 is a structural diagram of an apparatus for multiplexing a HIP security channel according to an embodiment of the present invention.

FIG. 3 is a schematic structural diagram of an apparatus for multiplexing a HIP security channel according to Embodiment 3 of the present invention. The apparatus for multiplexing a HIP security channel according to the embodiment of the present invention may be used as an independent apparatus and configured to multiplex the HIP security channel, or be used as a new part of an existing HIP proxy and also configured to multiplex the HIP security channel. As shown in FIG. 3, the apparatus may include:

a first receiving unit 301A, configured to receive a message for requesting to transmit data, where the message is sent from at least one traditional host to a HIP host;

a detection unit 302, configured to detect whether a HIP security channel is established with the HIP host;

a first signaling unit 303A, configured to transmit control signaling to the HIP host when the detection result of the detection unit 302 is true, where the control signaling is used to request to multiplex the established HIP security channel to transmit data of the traditional host; when a HIP proxy transmits the control signaling to the HIP host, the HIP proxy can transmit the control signaling through an established HIP security channel or encrypt or sign the control signaling using an HI of the HIP proxy and a private key corresponding to the HI; and a first control unit 304A, configured to transmit the data of the traditional host to the HIP host through the established HIP security channel when a response message returned from the HIP host is received.

Advantageously, the apparatus for multiplexing a HIP security channel may further include:

a second receiving unit 301B, configured to receive a message for requesting to transmit data, where the message is sent from at least one HIP host to a traditional host;

a second signaling unit 303B, configured to send a response message to the HIP host when control signaling sent from the HIP host is received and a HIP security channel is established with the HIP host, where the control signaling is used to request to multiplex the established HIP security channel to transmit data of the HIP host; and a second control unit 304B, configured to decapsulate the data, and transmit the data of the HIP host to the traditional host when the data sent from the HIP host is received.

Figure 4:
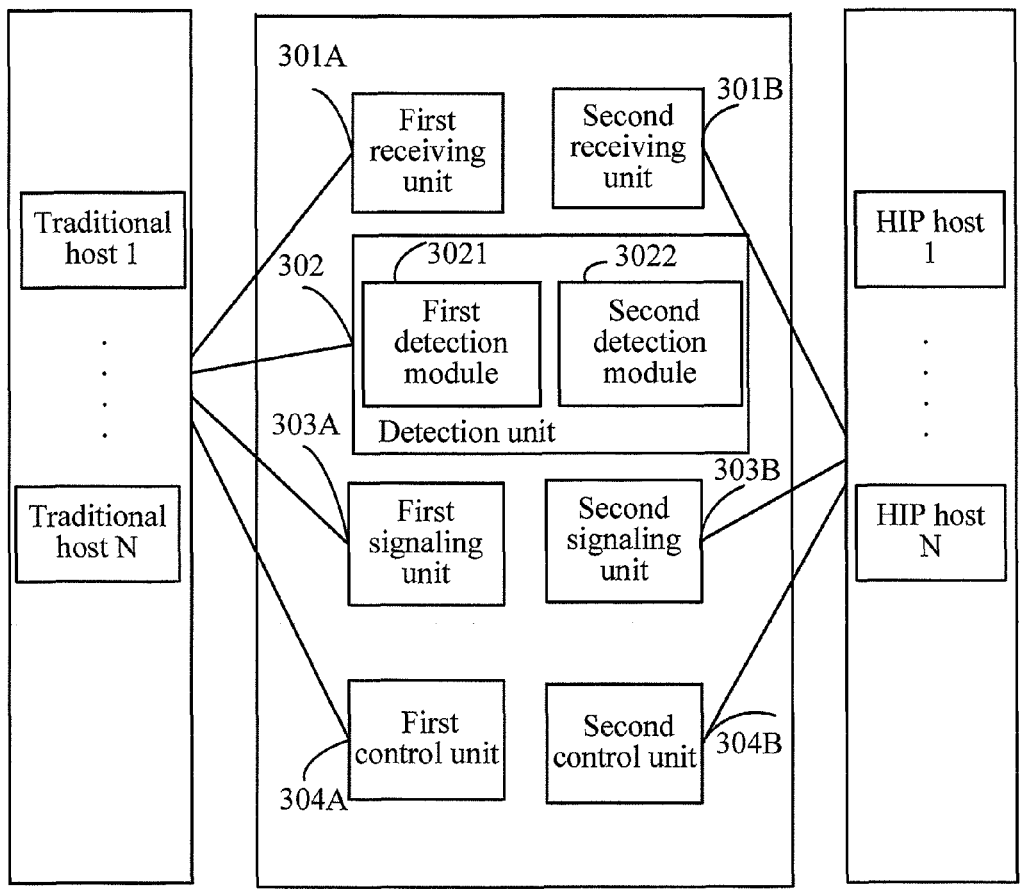
FIG. 4 is a structural diagram of an apparatus for multiplexing a HIP security channel according to another embodiment of the present invention.

FIG. 4 is a schematic structural diagram of another apparatus for multiplexing a HIP security channel according to Embodiment 3 of the present invention. The apparatus for multiplexing a HIP security channel as shown in FIG. 4 is obtained on the basis of the apparatus for multiplexing a HIP security channel as shown in FIG. 3. As shown in FIG. 4, the detection unit 302 may include:

a first detection module 3021, configured to detect whether valid HIP association information with the HIP host is stored, where the valid HIP association information is stored when the HIP security channel is established with the HIP host; and a second detection module 3022, configured to determine that the HIP security channel is established with the HIP host when the detection result of the first detection module 3021 is true; and when the detection result of the first detection module 3021 is false, determine that the HIP security channel is not established with the HIP host.

The first signaling unit 303A is specifically configured to transmit control signaling to the HIP host when the second detection module 3022 determines that the HIP security channel is established with the HIP host, where the control signaling is used to request to multiplex the established HIP security channel to transmit data of the traditional host.

The control signaling transmitted by the first signaling unit 303A may specifically carry identifier of the traditional host. The identifier of the traditional host may include at least one of the following contents: the SPI that the HIP proxy allocates to the traditional host, and the HIT and HI that the HIP proxy allocates to the traditional host. In this way, the HIP host can identify which traditional host performs data transmission with the HIP host.

The data of the traditional host that the first control unit 304A transmits to the HIP host through the established HIP security channel may be encapsulated according to a standard IPSec tunnel mode. For example, the IP address field in a second IP packet header following an ESP packet header is replaced with the HIT of the HIP host; or the SPI in an AH packet header is set to the SPI of the HIP host; or the SPI in the ESP packet header is set to the SPI of the HIP host; or the identifier of the HIP host is inserted between the ESP packet header and the second IP packet header; or the identifier of the HIP host is inserted between the AH packet header and a following IP packet header.

Or, the data of the traditional host that the first control unit 304A transmits to the HIP host through the established HIP security channel may be encapsulated according to a standard IPSec transport mode. For example, the SPI in the ESP packet header may be set to the SPI of the HIP host; or the SPI in the AH packet header is set to the SPI of the HIP host; or the identifier of the HIP host is inserted between the ESP packet header and a following transport layer protocol packet header; or the identifier of the HIP host is inserted between the AH packet header and the following transport layer protocol packet header. The identifier of the HIP host may include at least one of the following contents: the HIT and HI of the HIP host, and the SPI of the HIP host. The transport layer protocol packet may be a TCP packet, a UDP packet, or other transport layer protocol packet.

Or, the data of the traditional host that the first control unit 304A transmits to the HIP host through the established HIP security channel may be encapsulated according to a standard BEET mode. For example, the identifier of the HIP host is inserted between the ESP packet header and the following transport layer protocol packet header; or the identifier of the HIP host is inserted between the AH packet header and the following transport layer protocol packet header; or the SPI in the ESP packet header is set to the SPI of the HIP host; or the SPI in the AH packet header is set to the SPI of the HIP host. The identifier of the HIP host may include at least one of the following contents: the HIT and HI of the HIP host, and the SPI of the HIP host. The transport layer protocol packet may be a TCP packet, a UDP packet, or other transport layer protocol packet.

In Embodiment 3 of the present invention, when it is detected that a HIP security channel is established with the HIP host, control signaling may be transmitted to the HIP host, where the control signaling is used to request to multiplex the established HIP security channel to transmit the data of the traditional host. In this way, the quantity of HIP security channels established with the HIP host and the loads of maintaining the security channel are reduced, and the utilization of the HIP security channel is increased.

Embodiment 4

Figure 5:
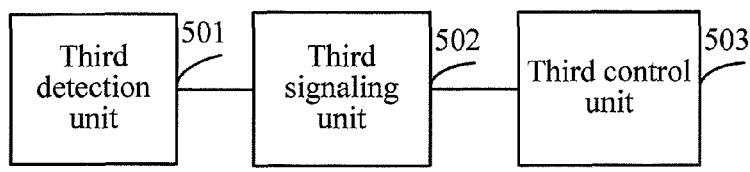
FIG. 5 is a structural diagram of a HIP host according to an embodiment of the present invention.

FIG. 5 is a schematic structural diagram of a HIP host according to Embodiment 4 of the present invention. As shown in FIG. 5, the HIP host may include:

a third detection unit 501, configured to detect whether a HIP security channel is established with a HIP proxy;

Specifically, when the HIP host needs to perform data transmission with one or multiple traditional hosts, the HIP host may start the third detection unit 501 to detect whether a HIP security channel is established with the HIP proxy.

A third signaling unit 502, configured to transmit control signaling to the HIP proxy when the detection result of the third detection unit 501 is true, where the control signaling is used to request to multiplex the established HIP security channel to transmit data of the HIP host; when transmitting the control signaling to the HIP proxy, the third signaling unit 502 can transmit the control signaling through an established HIP security channel or encrypt or sign the control signaling using an HI of the HIP host and a private key corresponding to the HI; and a third control unit 503, configured to transmit the data of the HIP host to the HIP proxy through the established HIP security channel when a response message returned from the HIP proxy is received.

Figure 6:
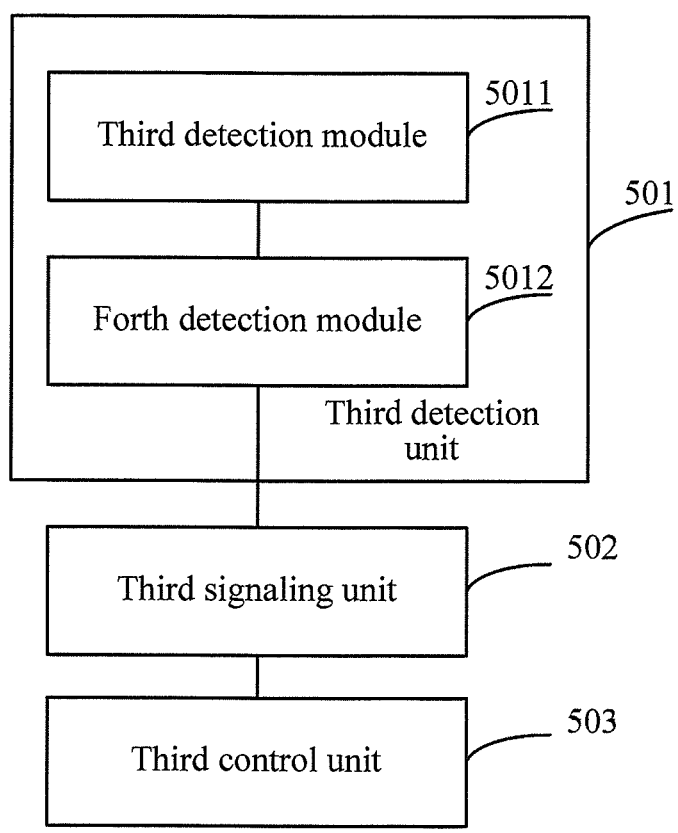
FIG. 6 is a structural diagram of a HIP host according to another embodiment of the present invention.

FIG. 6 is a schematic structural diagram of another HIP host according to Embodiment 4 of the present invention. The HIP host shown in FIG. 6 is obtained by optimizing the HIP host shown in FIG. 5. As shown in FIG. 6, the third detection unit 501 may include:

a third detection module 5011, configured to detect whether valid HIP association information with the HIP proxy is stored, where the valid HIP association information is stored when the HIP security channel is established with the HIP proxy; and a fourth detection module 5012, configured to determine that the HIP security channel is established with the HIP proxy when the detection result of the third detection module 5011 is true; and determine that the HIP security channel is not established with the HIP proxy when the detection result of the third detection module 5011 is false.

The third signaling unit 502 is specifically configured to transmit control signaling to the HIP proxy when the fourth detection module 5012 determines that the HIP security channel is established with the HIP proxy, where the control signaling is used to request to multiplex the established. HIP security channel to transmit data of the HIP host. When transmitting control signaling to the above HIP proxy, the third signaling unit 502 may transmit the control signaling through the established HIP security channel or encrypt or sign the control signaling using an HI of the HIP host and a private key corresponding to the HI.

The control signaling that the third signaling unit 502 transmits in the established HIP security channel may specifically carry the identifier of the HIP host. The identifier of the HIP host may include at least one of the following contents: the SPI of the HIP host, and the HIT and HI of the HIP host. In this way, the HIP proxy may identify which HIP host needs to multiplex the established HIP security channel to perform data transmission with the HIP proxy.

The data of the HIP host that the third control unit 503 transmits to the HIP proxy through the established. HIP security channel may be encapsulated according to a standard. IPSec tunnel mode. For example, the IP address field in a second IP packet header following an ESP packet header is replaced with the HIT that the HIP proxy allocates to the traditional host; or the SPI in an AH packet header is set to the SPI that the HIP proxy generates for the traditional host; or the SPI in the ESP packet header is set to the SPI that the HIP proxy generates for the traditional host; or the identifier of the traditional host is inserted between the ESP packet header and the second IP packet header; or the identifier of the traditional host is inserted between the AH packet header and the second IP packet header.

The data of the HIP host that the third control unit 503 transmits to the HIP proxy through the established HIP security channel may be encapsulated according to a standard IPSec transport mode. For example, the SPI in the ESP packet header may be set to the SPI that the HIP proxy generates for the traditional host.

Or, the SPI in the AH packet header is set to the SPI that the HIP proxy generates for the traditional host; or the identifier of the traditional host is inserted between the ESP packet header and a transport layer protocol packet header; or the identifier of the traditional host is inserted between the AH packet, header and the transport layer protocol packet header. The identifier of the traditional host may include at least one of the following contents: the HIT and HI that the HIP proxy allocates to the traditional host, and the SPI that the HIP proxy generates for the traditional host. The transport layer protocol packet may be a TCP packet, a UDP packet, or other transport layer protocol packet.

Or, the data of the HIP host that the third control unit 503 transmits to the HIP proxy through the established HIP security channel may be encapsulated according to a standard BEET mode. For example, the identifier of the traditional host is inserted between the ESP packet header and the transport layer protocol packet header; or the identifier of the traditional host is inserted between the AH packet header and the transport layer protocol packet header; or the SPI in the ESP packet header is set to the SPI that the HIP proxy allocates to the traditional host; or the SPI in the AH packet header is set to the SPI that the HIP proxy allocates to the traditional host. The identifier of the traditional host may include at least one of the following contents: the HIT and HI that the HIP proxy allocates to the traditional host, and the SPI that the HIP proxy generates for the traditional host. The transport layer protocol packet may be a TCP packet, a UDP packet, or other transport layer protocol packet.

After receiving the data sent from the HIP host through the established HIP security channel, the HIP proxy decapsulates the data sent from the HIP host and forwards the data to one or multiple corresponding traditional hosts.

In Embodiment 4 of the present invention, when the HIP host needs to perform data transmission with at least one host of the HIP proxy, if the HIP host detects that a HIP security channel is established between the HIP host and the HIP proxy, the HIP host may transmit control signaling to the HIP proxy to request to multiplex the established HIP security channel to transmit the data of the HIP host. In this way, the quantity of HIP security channels established between the HIP proxy and the HIP host and the loads of maintaining the security channel are reduced, and the utilization of the HIP security channel is increased.

In embodiments of the present invention, the traditional host may be considered to be a host that does not support the HIP protocol.

In embodiments of the present invention, when the HIP proxy or the apparatus for multiplexing a HIP security channel encapsulates the data sent to the HIP host through the HIP security channel, both the identifier of the traditional host and the identifier of the HIP host may be carried.

For example, when the data is encapsulated according to a standard IPSec tunnel mode, the source IP address field in the second IP packet header following the ESP packet header shown in Table 1 may be replaced with the HIT of the traditional host, and the destination IP address field is replaced with the HIT of the HIP host; or the AH packet header may be extended to carry the SPI of the traditional host as a source SPI and the SPI of the HIP host as a destination SPI; or the ESP packet header may be extended to carry the SPI of the traditional host as a source SPI and the SPI of the HIP host as a destination SPI; or the identifier of the traditional host and the identifier of the HIP host may be inserted between the ESP packet header and the second IP packet header; or the identifier of the traditional host and the identifier of the HIP host may be inserted between the AH packet header i and the second IP packet header.

In another example, when the data is encapsulated according to a standard IPSec transport mode, the ESP packet header shown in Table 2 may be extended to carry the SPI of the traditional host as a source SPI and the SPI of the HIP host as a destination SPI; or the AH packet header may be extended to carry the SPI of the traditional host as a source SPI and the SPI of the HIP host as a destination SPI; or the identifier of the traditional host and the identifier of the HIP host are inserted between the ESP packet header and the transport layer protocol packet header; or the identifier of the traditional host and the identifier of the HIP host are inserted between the AH packet header and the transport layer protocol packet header.

In another example, when the data is encapsulated according to a standard BEET mode, the identifier of the traditional host and the identifier of the HIP host may be inserted between an ESP packet header shown in Table 3 and a transport layer protocol packet header; or the identifier of the traditional host and the identifier of the HIP host are inserted between an AH packet header and a transport layer protocol packet header; or the ESP packet header is extended to carry the SPI of the traditional host as a source SPI and the SPI of the HIP host as a destination SPI; or the AH packet header is extended to carry the SPI of the traditional host as a source SPI and the SPI of the HIP host as a destination SPI.

In embodiments of the present invention, when the HIP host transmits data to the traditional host through the HIP proxy, the HIP host encapsulates the data to be sent to the HIP proxy.

For example, when the data is encapsulated according to a standard IPSec tunnel mode, the destination IP address field in the second IP packet header following the ESP packet header may be set to be the HIT that the HIP proxy allocates to the traditional host, and the source IP address field is set to the HIT of the HIP host; or the AH packet header is extended to carry the SPI that the HIP proxy generates for the traditional host as a destination SPI and the SPI of the HIP host as a source SPI; or the ESP packet header is extended to carry the SPI that the HIP proxy generates for the traditional host as a destination SPI, and the SPI of the HIP host as a source SPI; or the identifier of the traditional host and the identifier of the HIP host may be inserted between the ESP packet header and the second IP packet header; or the identifier of the traditional host and the identifier of the HIP host may be inserted between the AH packet header and the second IP packet header.

In another example, when the data is encapsulated according to a standard IPSec transport mode, the ESP packet header may be extended to carry the SPI that the HIP proxy generates for the traditional host as a destination SPI and the SPI of the HIP host as a source SPI; or the AH packet header is extended to carry the SPI that the HIP proxy generates for the traditional host as a destination SPI and the SPI of the HIP host as a source SPI; or, the identifier of the traditional host and the identifier of the HIP host are inserted between the ESP packet header and the transport layer protocol packet header; or, the identifier of the traditional host and the identifier of the HIP host are inserted between the AH packet header and the transport layer protocol packet header.

In another example, when the data is encapsulated according to a standard BEET mode, the identifier of the HIP host and the identifier of the traditional host may be inserted between an ESP packet: header and a transport layer protocol packet header; or the identifier of the HIP host and the identifier of the traditional host are inserted between an AH packet header and a transport layer protocol packet header; or the ESP packet header is extended to carry the SPI of the HIP host as a source SPI and the SPI that the HIP proxy allocates to the traditional host as a destination SPI; or the AH packet header is extended to carry the SPI of the HIP host as a source SPI and the SPI that the HIP proxy allocates to the traditional host as a destination SPI.

It is understandable to persons of ordinary skill in the art that all or some of the steps in the preceding method embodiments may be implemented by related hardware instructed by a program. The program may be stored in a computer readable storage medium. When the program is executed, the steps of the preceding method embodiments are implemented. The storage medium includes any medium that can store program codes, such as a read-only memory (ROM), a random access memory (RAM), a magnetic disk, or an optical disk.

Detailed above are a method and an apparatus for multiplexing a HIP security channel according to embodiments of the present invention. The principle and implementation of the present invention are described through some exemplary embodiments, but these embodiments are only used to help understand the method and core idea of the present invention. Persons of ordinary skill in the art can make various modifications and variations with respect to the implementation and applicability without departing from the idea of the invention. In conclusion, the contents of the specification should not be construed as limitations on the present invention.

What is claimed is:

1. A method for multiplexing a host identity protocol (HIP) security channel, the method comprising:
   receiving a message for requesting to transmit data, where the message is sent from at least one traditional host to a HIP host;
   detecting whether a HIP security channel is established with the HIP host; if the HIP security channel is established, transmitting control signaling to the HIP host, wherein the control signaling is used to request to multiplex the HIP security channel to transmit data of the traditional host;
   if a response message returned from the HIP host is received, transmitting the data of the traditional host to the HIP host through the HIP security channel; and
   wherein detecting whether a HIP security channel is established with the HIP host comprises:
      detecting whether valid HIP association information with the HIP host is stored, wherein the valid HIP association information is stored when the HIP security channel is established with the HIP host,
      if the valid HIP association information with the HIP host is stored, determining that the HIP security channel is established with the HIP host, and
      if the valid HIP association information with the HIP host is not stored, determining that the HIP security channel is not established with the HIP host.

2. The method according to claim 1, wherein the control signaling carries identifier of the traditional host, the identifier of the traditional host comprises at least one of the following contents:
   a host identity tag (HIT) and a host identity (HI) that a HIP proxy allocates to the traditional host, and a security parameter index (SPI) that identifies the traditional host in the established HIP security channel.

3. The method according to claim 1, wherein before transmitting data of the traditional host to the HIP host through the HIP security channel, the method further comprises:
   encapsulating the data of the traditional host sent to the HIP host through the HIP security channel.

4. The method according to claim 3, wherein the encapsulating the data of the traditional host sent to the HIP host through the HIP security channel comprises:
   when encapsulating the data according to an Internet Protocol security (IPSec) tunnel mode, replacing a destination IP address field in an IP packet following an encapsulating security payload (ESP) packet header with a host identity tag (HIT) of the HIP host and replacing a source IP address field with a HIT of the traditional host; or extending an authentication header (AH) packet header to carry a security parameter index (SPI) of the HIP host as a destination SPI and an SPI of the traditional host as a source SPI; or extending an ESP packet header to carry the SPI of the HIP host as a destination SPI and the SPI of the traditional host as a source SPI; or inserting identifier of the HIP host and identifier of the traditional host between an AH packet header and a following IP packet header; or inserting identifier of the HIP host and identifier of the traditional host between an ESP packet header and a following IP packet header;

when encapsulating the data according to an IPSec transport mode, extending an ESP packet header in the IPSec transport mode to carry an SPI of the HIP host as a destination SPI; or inserting identifier of the HIP host and identifier of the traditional host between an ESP packet header and a transport layer protocol packet header; or extending an AH packet header to carry an SPI of the HIP host as a destination SPI and an SPI of the traditional host as a source SPI; or inserting identifier of the HIP host and identifier of the traditional host between an AH packet header and a transport layer protocol packet header; and when encapsulating the data according to a bound end-to-end tunnel (BEET) mode, inserting identifier of the HIP host and identifier of the traditional host between an ESP packet header and a transport layer protocol packet header; or inserting identifier of the HIP host and identifier of the traditional host between an AH packet header and a transport layer protocol packet header; or extending an ESP packet header to carry an SPI of the HIP host as a destination SPI and an SPI of the traditional host as a source SPI; or extending an AH packet header to carry an SPI of the HIP host as a destination SPI and an SPI of the traditional host as a source SPI.

5. A method for multiplexing a host identity protocol (HIP) security channel, the method comprising:
   detecting, by a HIP host, whether a HIP security channel is established with a HIP proxy; if the HIP security channel is established, transmitting control signaling to the HIP proxy, wherein the control signaling is used to request to multiplex the HIP security channel to transmit data of the HIP host to a traditional host through the HIP proxy;
   if a response message returned from the HIP proxy is received, transmitting the data of the HIP host to the HIP proxy through the HIP security channel; and
   wherein detecting, by the HIP host, whether the HIP security channel is established with the HIP proxy comprises:
      detecting, by the HIP host, whether valid HIP association information with the HIP proxy is stored, wherein the valid HIP association information is stored when the HIP security channel is established with the HIP proxy, and
      if true, determining that the HIP security channel is established with the HIP proxy, and
      if false, determining that the HIP security channel is not established with the HIP proxy.

6. The method according to claim 5, wherein the control signaling carries identifier of the HIP host, wherein the identifier of the HIP host comprises at least one of the following contents:
   a host identity tag (HIT) and a host identity (HI) of the HIP host, and a security parameter index (SPI) of the HIP host.

7. The method according to claim 5, wherein before transmitting the data of the HIP host to the HIP proxy through the HIP security channel, the method further comprises:
   encapsulating the data of the HIP host sent to the HIP proxy through the HIP security channel.

8. The method according to claim 7, wherein the encapsulating the data of the HIP host sent to the HIP proxy through the HIP security channel comprises:
   when encapsulating the data according to an Internet Protocol security (IPSec) tunnel mode, replacing a destination IP address field in an IP packet header following an encapsulating security payload (ESP) packet header or an authentication header (AH) packet header with a host identity tag (HIT) that the HIP proxy allocates to the traditional host, and setting a source IP address field to a HIT of the HIP host; or extending an ESP packet header or an AH packet header to carry a security parameter index (SPI) that the HIP proxy generates for the traditional host as a destination SPI and an SPI of the HIP host as a source SPI; or inserting identifier of the traditional host and identifier of the HIP host between an ESP packet header and a following IP packet header; or inserting identifier of the traditional host and identifier of the HIP host between an AH packet header mode and a following IP packet header;

when encapsulating the data according to an IPSec transport mode, extending an ESP packet header i to carry an SPI that the HIP proxy generates for the traditional host as a destination SPI and an SPI of the HIP host as a source SPI; or inserting identifier of the traditional host and identifier of the HIP host between the ESP packet header and a transport layer protocol packet header; or extending an AH packet header to carry the SPI that the HIP proxy generates for the traditional host as a destination SPI and the SPI of the HIP host as a source SPI; or inserting identifier of the traditional host and identifier of the HIP host between the AH packet header and a transport layer protocol packet header; and when encapsulating the data according to a bound end-to-end tunnel (BEET) mode, inserting identifier of the traditional host and identifier of the HIP host between an ESP packet header and a transport layer protocol packet header; or inserting identifier of the traditional host and identifier of the HIP host between an AH packet header and a transport layer protocol packet header; or extending an ESP packet header or an AH packet header to carry an SPI that the HIP proxy generates for the traditional host as a destination SPI and an SPI of the HIP host as a source SPI.

9. An apparatus for multiplexing a host identity protocol (HIP) security channel, the apparatus comprising:
   a first receiving unit, configured to receive a first message for requesting to transmit data, where the first message is sent from at least one traditional host to a HIP host;
   a detection unit, configured to detect whether a HIP security channel is established with the HIP host;
   a first signaling unit, configured to transmit control signaling to the HIP host when a detection result of the detection unit is true, wherein the control signaling is used to request to multiplex the HIP security channel to transmit data of the traditional host;
   a first control unit, configured to transmit the data of the traditional host to the HIP host through the HIP security channel when a response message returned from the HIP host is received;
   a second receiving unit, configured to receive a second message for requesting to transmit data, where the second message is sent form at least one HIP host to a traditional host;
   a second signaling unit, configured to send a response message to the HIP host when receiving control signaling from the HIP host and a HIP security channel is established with the HIP host, wherein the control signaling is used to request to multiplex the established HIP security channel to transmit data of the HIP host; and a second control unit, configured to decapsulate the data and transmit the data of the HIP host to the traditional host when receiving the data sent from the HIP host.

10. An apparatus for multiplexing a host identity protocol (HIP) security channel, the apparatus comprising:
a first receiving unit, configured to receive a first message for requesting to transmit data, where the first message is sent from at least one traditional host to a HIP host;
a detection unit, configured to detect whether a HIP security channel is established with the HIP host;
a first signaling unit, configured to transmit control signaling to the HIP host when a detection result of the detection unit is true, wherein the control signaling is used to request to multiplex the HIP security channel to transmit data of the traditional host;
a first control unit, configured to transmit the data of the traditional host to the HIP host through the HIP security channel when a response message returned from the HIP host is received; and
wherein the detection unit comprises:
a first detection module, configured to detect whether valid HIP association information with the HIP host is stored, wherein the valid HIP association information is stored when the HIP security channel is established with the HIP host; and
a second detection module, configured to determine that the HIP security channel is established with the HIP host when a detection result of the first detection module is true; and determine that the HIP security channel is not established with the HIP host when the detection result of the first detection module is false.

11. An apparatus for multiplexing a host identity protocol (HIP) security channel, the apparatus comprising:
a first receiving unit, configured to receive a first message for requesting to transmit data, where the first message is sent from at least one traditional host to a HIP host;
a detection unit, configured to detect whether a HIP security channel is established with the HIP host;
a first signaling unit, configured to transmit control signaling to the HIP host when a detection result of the detection unit is true, wherein the control signaling is used to request to multiplex the HIP security channel to transmit data of the traditional host;
a first control unit, configured to transmit the data of the traditional host to the HIP host through the HIP security channel when a response message returned from the HIP host is received;

wherein the control signaling transmitted by the first signaling unit carries identifier of the traditional host;
wherein the control signaling transmitted by the second signaling unit carries identifier of the HIP host; and
the identifier of the traditional host comprises at least one of the following contents:
a host identity tag (HIT) and a host identity (HI) that a HIP proxy allocates to the traditional host, and a security parameter index (SPI) that identifies the traditional host in the established HIP security channel; and the identifier of the HIP host comprises at least one of the following contents: a HIT and an HI of the HIP host, and an SPI of the HIP host.

12. The apparatus according to claim 9, wherein the first control unit is further configured to encapsulate the data of the traditional host sent to the HIP host in the HIP security channel.

13. A host identity protocol (HIP) host, comprising:
a third detection unit, configured to detect whether a HIP security channel is established with a HIP proxy;
a third signaling unit, configured to transmit control signaling to the HIP proxy when a detection result of the third detection unit is true, wherein the control signaling is used to request to multiplex the HIP security channel to transmit data of the HIP host;
a third control unit, configured to transmit the data of the HIP host to the HIP proxy through the HIP security channel when a response message returned from the HIP proxy is received; and
wherein the third detection unit comprises:
a third detection module, configured to detect whether valid HIP association information with the HIP proxy is stored, wherein the valid HIP association information is stored when the HIP security channel is established with the HIP proxy, and
a fourth detection module, configured to determine that the HIP security channel is established with the HIP proxy when a detection result of the third detection module is true; and determine that the HIP security channel is not established with the HIP proxy when the detection result of the third detection module is false.

14. The host identity protocol host according to claim 13, wherein the control signaling transmitted by the third signaling unit carries identifier of the HIP host, and the identifier of the HIP host comprises at least one of the following contents:
a host identity tag (HIT) and a host identity (HI) of the HIP host, and a security parameter index (SPI) that identifies the HIP host in the established HIP security channel.

* * * * *